Patented Sept. 25, 1928.

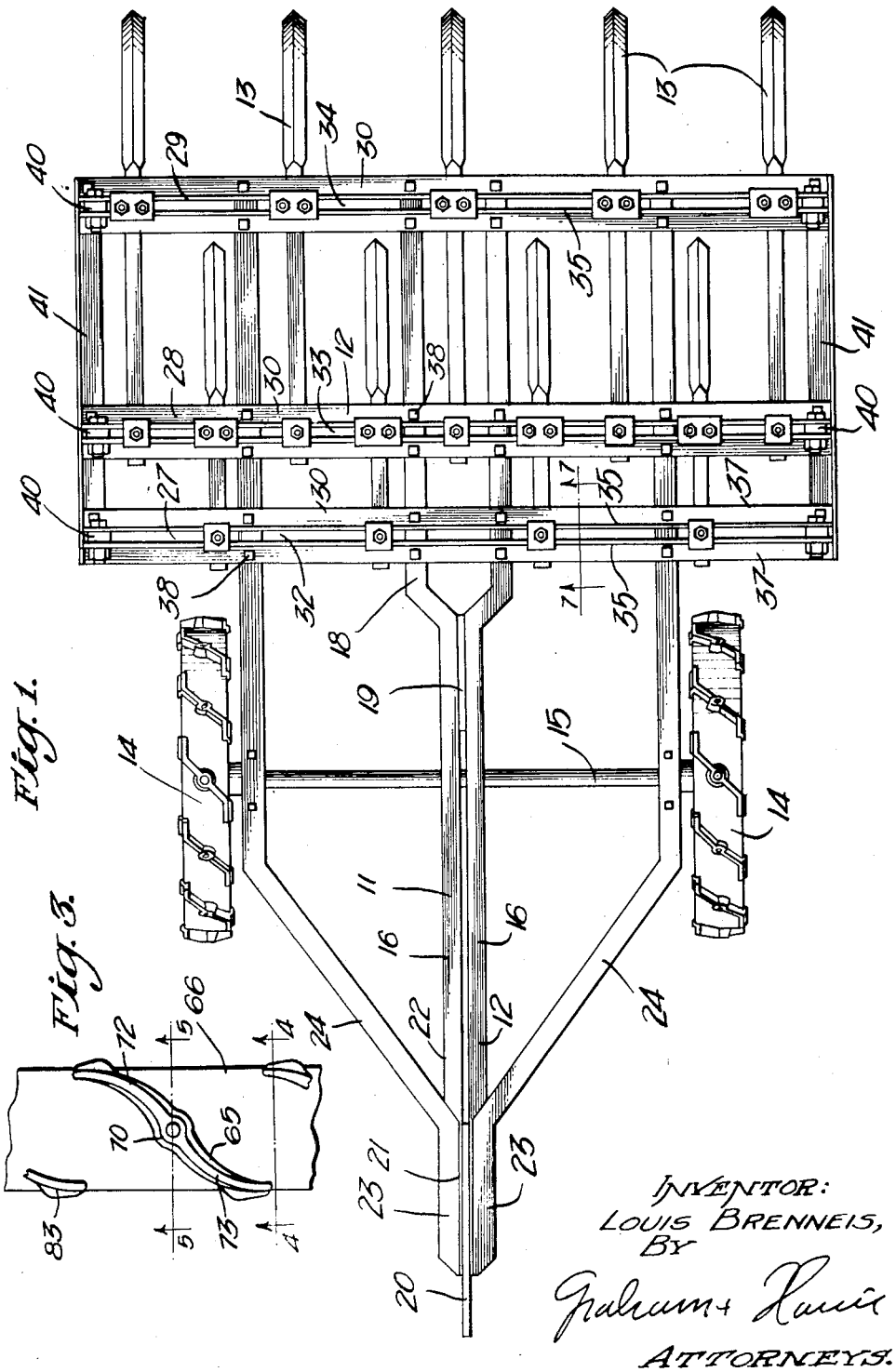

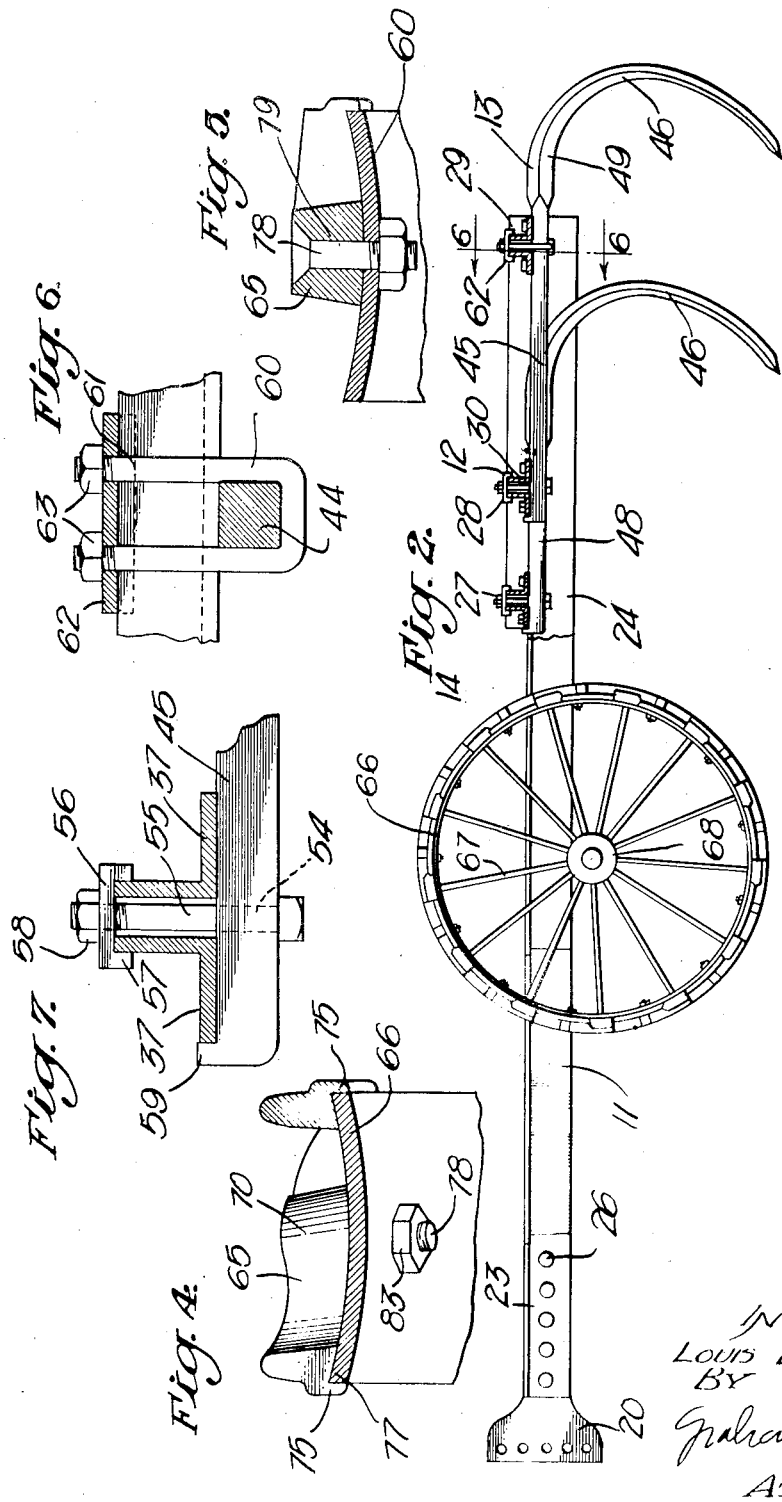

1,685,478

UNITED STATES PATENT OFFICE.

LOUIS BRENNEIS, OF OXNARD, CALIFORNIA, ASSIGNOR TO BRENNEIS MANUFACTURING COMPANY, A CORPORATION OF CALIFORNIA.

CULTIVATOR.

Application filed March 10, 1924, Serial No. 698,058. Renewed July 27, 1927.

This invention relates to agricultural implements and relates particularly to wheeled vehicles such as cultivators.

It is an object of the invention to provide a cultivator having cultivator bars which are adjustably disposed upon a supporting frame so that the spacing therebetween may be varied to suit existing conditions.

It is an object of the invention to provide a simple construction whereby the adjustment of the cultivator bars is made possible without excessive cost in the implement.

The especial advantages and further objects of the invention will be made evident hereinafter.

Referring to the drawings, which are for illustrative purposes only,

Fig. 1 is a plan view of a cultivator embodying the features of my invention.

Fig. 2 is an elevation thereof.

Fig. 3 is a fragmentary enlarged view of a portion of a wheel rim showing a form of my improved grouser, mounted thereon.

Fig. 4 is a section taken substantially upon a line 4—4 of Fig. 3.

Fig. 5 is a section taken on a plane represented by the line 5—5 of Fig. 3.

Fig. 6 is a section taken as indicated by the line 6—6 of Fig. 2.

Fig. 7 is an enlarged section taken on the plane represented by the line 7—7 of Fig. 1.

In Figs. 1 and 2 of the drawing, I show a form of my cultivator which is comprised essentially of a frame structure 11 having a supporting structure 12 at the rearward end thereof to which cultivator bars 13 are secured and means mobilely supporting the frame which are herein illustrated in the form of wheels 14. The wheels 14 are commonly mounted upon an axle such as represented at 15 and means are provided for lifting the frame 11 so as to raise the cultivator bars out of engagement with the soil. This, however, forms no part of the present invention, it being evident that any of the common forms of lifting mechanism may be employed. Therefore, the support means shown in the drawings is represented simply as supporting wheels 14 and a simple supporting axle. The frame 11 employs a pair of centrally disposed structural channels 16 placed with their flanges facing outwardly. These channels 16 are bent into forked form as shown at 18 and the webs thereof are spaced apart by a plate 19. A draught plate 20 is disposed between the forward ends of the channels 16. As indicated at 21, the flanges 22 of the channels 16 are cut off from the forward ends and the forward ends 23 of side angles 24 are secured against the forward ends of the channel webs by rivets 26. To the rearward ends of the frame members 16 and 24, the supporting frame work 12 is secured. This frame work 12 is comprised of three pairs 27, 28 and 29 of angles 30 which are placed laterally across the rearward ends of the members 16 and 24 and are spaced apart to provide lateral horizontally directed channels 32, 33 and 34 between the vertically arranged legs 35 of the angles 30. The horizontally projecting legs 37 of the angles 35 are secured to the members 16 and 24 by bolts 38. The ends of the pairs of angles are spaced apart by spacers 40 and for the purpose of reinforcement, angles 41 are secured at the ends of the laterally disposed angles 30. The cultivator bars 13 each comprise a straight shaft or bar portion 45 and a tine portion 46 formed on the rearward ends thereof. In the cultivator shown, it is convenient to employ a forward set of cultivator bars designated as 48 and a rearward set of cultivator bars designated as 49. The cultivator bars 48 rest across the under faces of the pair of angle members 27 and 28, so that the shaft or bar portions 45 of these cultivator bars 48 extend across the channels 32 and 33. The rearward cultivator bars designated at 49 are arranged to extend across the channels 33 and 34 and are disposed intermediately between the cultivator bars of the forward set 48. As shown in Fig. 7, the rearward ends of the cultivator bars 45 are equipped with holes 54 through which clamping bolts 55 extend, these clamping bolts project upwardly through the channel 32 in the case of the forward set of cultivator bars or upward through the channel 33 in the case of the rearward set of cultivator bars 49. Plate members 56 having the edges thereof bent downwardly as indicated at 57 are employed as means against which the nuts 58 employed with the bolts 55 may be tightened in a manner to clamp the forward ends of the bars 45 to the under faces presented by the laterally extending legs 37 of the angles 30.

It will be perceived that an outwardly projecting toe or hook 59 is formed upon the end of each cultivator bar so that the pull on the bars will be received against the angles 30.

The rearward portions of the shafts 45 constituting parts of the cultivator bars 13 are clamped in place by U bolts 60, such as shown in Fig. 6, these U bolts being arranged to extend around the shaft portion 45 and upwardly through the lateral channels 33 and 34, the upper threaded ends 61 thereof projecting through openings in plates 62, against which plates, the nuts 63 are tightly screwed.

It will be recognized that the bolting means consisting of the bolts 55 and U bolts 61 may be moved laterally in the channels 32, 33 and 34, thus making it possible to change the spacing of the cultivator bars 13 in a manner to give the desired spacing of furrows which are formed in the soil by the tines 46.

The wheels 14 are equipped with my improved form of grouser 65 which is preferably of the form shown in Fig. 3. The wheel 14 is equipped with a metal rim 66 supported by a suitable structure, which in this case is shown as spokes 67 and a hub structure 68. A feature of the grouser shown in Figs. 3, 4 and 5 is that a projecting elongated mass of metal is situated upon the rim of the wheel in such a manner that soil is engaged thereby, but these grousers are of such form that a bumpy travel of the vehicle is not caused when the cultivator is being drawn over a hard surface such as a road way. The grousers as shown in Fig. 3 provide a central truncated conical portion 70 from which a pair of curved arms 72 and 73 outwardly extend. These arms are diametrally disposed so that a reverse S shaped curve is presented. The rims 66 of the wheels 14 are preferably concave in form as shown in Figs. 4 and 5 and the under faces of the grousers 65 are of concave form to correspond to the outer face of the wheel. The arms 72 and 73 of the grousers are arranged helically or diagonally with respect to the wheel rim and downwardly projecting lips 75 engage the edges 77 of the rim 66, these lips 75 having the function of preventing lateral rotation of the arms 72 and 73 which would otherwise result from the rotation of the grousers on the securing bolts 78 which are extended through suitable openings 79 provided in the truncated conical portions of the grousers. Nuts 83 are employed upon the inner ends of the bolts 78; these nuts bearing against the under face of the rim 66, holding the grousers 65 securely in place. From Figs. 1 and 3, it will be noticed that the forward end of the arm 72 overlaps, or in other words, projects slightly beyond the rearward end of the preceding grouser indicated at 80 and that the forward end 81 of the succeeding grousers slightly overlaps the rearward end of the arm 73. It will be recognized that a continuous circular or cylindrical contact with the ground is accomplished by outer faces of the entire composition of grousers arranged upon each wheel, thereby providing a smooth running action over road ways or pavements which serves to reduce vibration throughout the vehicle and is also less destructive to the road surface than where the common type of grouser is employed.

I claim as my invention:

1. In a cultivator, the combination of: a frame; bar members placed in parallel relationship and directed laterally so as to form lateral horizontal directed channels; earth tools having horizontal securing bars, each of which is arranged to extend across two of said lateral channels; bolt means extending through the forward one of said two lateral channels and securing the forward ends of the tool bars in place; and U-bolts extending through the rearward one of said two lateral channels and looping around said tool bars to secure the rearward ends of said tool bars in place, all of said bolt means and U-bolts being slidably disposed in the respective lateral channels to provide adjustment in spacing of said earth tools.

2. In a cultivator, the combination of: a frame; bar members placed in parallel relationship and directed laterally so as to form lateral horizontally directed channels; earth tools having horizontal securing bars, each of which is arranged to extend across two of said lateral channels; bolt means extending through the forward one of said two lateral channels and securing the forward ends of the tool bars in place; and U-bolts extending through the rearward one of said two lateral channels and looping around said tool bars to secure the rearward ends of said tool bars in place, all of said bolt means and U-bolts being slidably disposed in the respective lateral channels to provide adjustment in spacing of said earth tools, said tool bars each having a hook projection engaging one of said frame bar members to transmit the pull of the respective earth tool directly to said bar member.

3. In an agricultural implement, the combination of: a frame including two relatively spaced pairs of transverse members, the members of each pair being disposed in relative parallel spaced relationship with each other to provide an intermediate slot extending lengthwise therebetween; tool bars extending across and abutting against both pairs of transverse members; locking means slidable in said slots and capable of being secured in place therein, said locking means engaging only said tool bars to rigidly lock same to said frame in any preferred positions; and ground working tools each fixed to one of said tool bars independently of said locking means.

4. A combination as defined in claim 3, in which the ground working tools are formed by rearwardly and downwardly extending portions of said tool bars.

5. In an agricultural implement, the combination of: a frame including three relatively spaced pairs of transverse members, the members of each pair being disposed in relative parallel spaced relationship with each other to provide an intermediate slot extending lengthwise therebetween; a first series of tool bars extending across and abutting against the forward and the intermediate pairs of transverse members; a second series of tool bars extending across and abutting against the intermediate and the rearward pairs of transverse members; locking means associated with the forward and the intermediate pairs of transverse members and engaging only the first series of tool bars; other locking means associated with the intermediate and the rearward pairs of transverse members and engaging only the second series of tool bars, said locking means being slidable in said slots and capable of being secured in place therein to rigidly lock the tool bars in any preferred positions; and ground working tools each fixed to one of said tool bars independently of said locking means.

6. A combination as defined in claim 5, in which the ground working tools are formed by rearwardly and downwardly extending portions of said tool bars.

In testimony whereof, I have hereunto set my hand at Oxnard, California, this 25th day of February, 1924.

LOUIS BRENNEIS.